Patented Jan. 10, 1950

2,493,943

UNITED STATES PATENT OFFICE 2,493,943

SURGICAL SUTURE AND METHOD

John O. Bower, Wyncote, Pa.

No Drawing. Application September 15, 1943, Serial No. 502,503

3 Claims. (Cl. 128—335.5)

My invention relates to surgical sutures. Those of the most commonly used types are composed of catgut of one or more strands depending upon the size and the relative grade of fineness or coarseness. The catgut is ultimately absorbed and removed by the human system in the healing of a wound, the white corpuscles attacking and removing the greater part at least of the foreign fibre and other matter of which catgut is composed. However, it will be seen my invention has relation also to other types of sutures.

The prime object of my invention is to render this process of absorption and removal as free as possible from irritation of the tissues of the human body which contain the suture after a surgical operation. By the same token, my object is to free the suture per se of those qualities which produce irritation so long as it or any part of it remains in the human body following an operation. Thus not only will there be less irritation to the parts in which it is imbedded or with which it is in contact at the inception of the closing of a wound, but also there will be less continuing irritation, and the white corpuscles will be enabled the more readily to do their work and the more quickly to complete it.

According to my invention the suture is formed in part or in whole of a constituency of human or other animal blood. I have impregnated some catgut sutures with normal fresh human blood and others with hemoglobin of different forms, and have found them both highly effective in attaining my objects. Hemoglobin is a protein constituent of the red blood corpuscles of the human body. I propose forming sutures in their entirety or in large part of a constituency of blood.

I have found by actual experiment with catgut sutures impregnated with hemoglobin that the objects of my invention are attained in full. These experiments were made by impregnating fine catgut sutures with a solution of hemoglobin and sewing three or four centimeters of loops of such sutures under the serous membrane or peritoneal covering of the stomachs of rabbits. Specimens taken after healing and subjected to microscopic examination and compared with specimens taken from healing in connection with untreated ordinary catgut sutures of the same size show in comparison a minimal amount of irritation and a maximum absorption of the suture with a far greater perfection of the healing. Also, my personal observation and experience of years in the use of untreated sutures shows me that the time of healing is materially shortened when the sutures treated according to my invention are used.

More specifically, this suture I have treated by impregnating by immersion to a point of substantially complete saturation in a hemoglobin solution containing very approximately 15 grams of hemoglobin to 100 cubic centimeters of the solution and thereafter removing the sutures and drying in air. The sutures so prepared I have preserved dry in ordinary atmosphere apparently without deterioration over a considerable period of days and weeks. I know of no reason why they may not be preserved without deterioration of their beneficial behaviors as above recited for very much greater periods. I have also preserved such sutures in vacuum and experimented with those preserved in vacuum as compared with those preserved in air without noting substantial difference in beneficial results. Still further, I contemplate preserving such saturated sutures in a body of the saturating solution and then removing and using them wet or dried, as desired.

Still more specifically, one hemoglobin solution used by me in impregnating the catgut sutures was what is known as an oxyhemoglobin solution. This is a red blood corpuscle protein solution produced by what is known to me as the Amberson process of producing from the red blood corpuscles a hemoglobin which retains its oxygen. Another form of hemoglobin I have used with beneficial results is what is known as the methemoglobin, hemoglobin from which the oxygen has been removed. The ordinary process of removing the oxygen is to expose the oxyhemoglobin to atmospheric air over a period of hours. The methane content of the atmosphere is believed gradually to convert or remove the oxygen content. The oxyhemoglobin solution, usually blood red, is in this manner converted to a black solution, methemoglobin.

The Amberson solution is that produced according to the method of Dr. William R. Amberson of the University of Western Maryland, whose method is very approximately the following:

Red blood cells are first washed several times, say three or more times, in a saline solution of 1½%. After each washing the supernatant liquid is withdrawn by centrifuging, leaving but a small amount of water mixed with the cells. The cells are then broken by washing with an equal amount of a 20% solution of ether. That is, to each 100 cc. of cells is added 100 cc. of 20% ether solution. The mixture is stirred slowly until it jells and then rapidly to break up the jell and unify the solution, whereupon it is centrifuged for 45 minutes. After such centrifuging operation the bottom liquid in the centrifuge is withdrawn. The top is comprised mostly of a jell of cell wall tissue which is not used in preparing the Amberson solution, but discarded. The withdrawn bottom liquid is a blood red solution. This is put through a No. 3 pad in a Horm filter. The filtered product is dialyzed in a cellulose sausage membrane to remove the excess of potassium which has been found to be generally harmful to the human system. The dialyzing is carried out at a temperature from 37 to 40° F. The residue in the sausage casing is then removed and again put through a Horm filter, this time with a No. 0 pad. After filtering it is vacuumized to remove the ether remaining from the cell breaking solution, and the free oxygen. The result is very approximately a substantialy ether free 15% solution of oxyhemoglobin, that is to say, a solution containing approximately 15 grams of hemoglobin protein to each 100 cubic centimeters.

An alternative method of my own consists of breaking the cell walls by extreme freezing (at —75 to —85° F.) before centrifuging in the ether solution, thus enabling the ether solution to act more promptly and effectively. As a further alternative I propose simplifying the process by omitting the final vacuumizing step and thereafter utilizing the solution containing whatever moderate residue of ether and oxygen remains, a small amount if used wet and a still smaller amount if used after drying.

From the foregoing it must be obvious that my invention may be achieved by several means and by several methods. My work has brought me success so recently that I have by no means explored all of the means and methods by which it may be achieved. For example, I have already indicated that the form of the hemoglobin may be varied as between the oxyhemoglobin and the methemoglobin. I have also discovered that saturating catgut sutures in fresh normal human blood, and then preserving the saturated and wetted sutures in a vacuum produces excellent results for preservation. Either as so wetted and saturated or submerged under blood in vacuo, preservation in vacuo was perfect. Such sutures were used by me both wet and dry after such preservation and the results compared most favorably with the results from hemoglobin solution impregnated sutures. I propose also preserving by drying immediately after the fresh blood saturation.

I have already indicated that other sutures than catgut sutures may be utilized. There are numerous other organic sutures. In fact, I am of the view that my invention may be utilized to some advantage in connection with inorganic sutures in certain cases where the solution used to produce the non-irritant quality may be either absorbed by the suture or carried as a coating, depending upon the nature of the suture used. My invention contemplates coating also of certain organic sutures, or both impregnating and coating the same suture. Other beneficial constituents of blood in addition to hemoglobin may be similarly embodied in or applied to sutures. Animal blood other than human blood may be used, though perhaps with somewhat less than the full advantages which I have attained.

Synthetic sutures are known to me to have been proposed. I contemplate that the non-irritant constituents of my invention may be introduced into the synthetic structures during their making, introduced at any suitable point in the synthesis or in the after synthesis treatments. For example, in a synthetic process such as the processes of the rayon industry, the blood constituent may be introduced either as a part of the spinning solution, as a part of the precipitating bath, or a part of the setting solution. Furthermore, it may be applied to the synthetic suture either in some intermediate stage, as between precipitating and setting, or between setting and washing, or between washing and drying, etc. It may be applied after drying.

Finally, acording to yet another and very important modification of my invention, I propose to form the suture in its entirety, or in large part, of a constituency of blood. One method of doing this is to make a spinning solution of the blood, and spin sutures in a precipitating bath like rayon or nylon is spun, either as a yarn of a number of filaments to be subsequently twisted into a thread or as a single filament of full suture size and strength. I propose using as the base substance for the spinning solution the now wasted by-products of plasma extraction from fresh human blood. The whole or the large part of this large volume of waste can be used. This consists in largest part of the red and white blood cells of the blood, the red full of hemoglobin, their protein content. I deem the cell wall tissues of especial suitability for the preparation of the spinning solution. Such residue from plasma extraction or the cell wall jell left after hemoglobin separation, are to be chemically treated by such dissolving agencies as applicable in the preparation of animal fibre or other matter for rayon spinning solutions. The spinning is to be done in a bath of such precipitant as is applicable to filaments spun from solutions having an animal fibre base as distinguished from a vegetable fibre base. Subsequent treatments will follow the same idea of suitability leading from the animal matter base.

Where the word "consituency" is used herein, it is employed in its dictionary significance, as meaning "a group of constituents". As previously indicated, these constituents include, as an essential component, hemoglobin itself, and preferably also such of the other constituents of the corpuscular portion of blood as will pass the filter, with or without the inclusion of still other constituents from the whole blood.

These and all other modifications of my invention it is my intention to comprehend in the annexed claims according to the generic spirit of my invention.

Reference may be had to copending application 547,317, filed July 29, 1944, now Patent No. 2,457,804, dated January 4, 1949, in which are presented claims specific to the extrusion-spinning of hemoglobin-containing sutuers, that is, sutures spun as rayon is spun. The application referred to is a continuation-in-part of the present case.

What I claim is:

1. A surgical suture which has been impregnated with an hemoglobin solution.

2. A surgical suture of catgut which has been treated by immersion in an hemoglobin solution containing very approximately 15 grams of hemoglobin per 100 cubic centimeters of solution until substantially maximum absorption of the solution by the catgut has been obtained.

3. A surgical suture having as a major component the corpuscular constituents of animal blood remaining after extraction of plasma or serum.

JOHN O. BOWER.

(References on following page)

REFERENCES CITED

The following references are of record in the file of this patent:

UNITED STATES PATENTS

| Number | Name | Date |
|---|---|---|
| 1,504,225 | Fitzgerald | Aug. 12, 1924 |
| 1,593,814 | Vogel | July 27, 1926 |
| 1,999,641 | Sharp | Apr. 30, 1935 |

FOREIGN PATENTS

| Number | Country | Date |
|---|---|---|
| 422,990 | Great Britain | Jan. 23, 1935 |
| 393,505 | Great Britain | Mar. 10, 1932 |
| 165,832 | Great Britain | July 11, 1921 |

OTHER REFERENCES

"Local application of fibrogen as hemostatic," page 254, Mod. Drug. Encyclopedia, Gutman, 2nd ed.

"Influence of urea upon blood clotting," J. H. Foulger & C. A. Mills, Am. Jour. of Physiology, 1930, vol. 94, pages 51–59.

"The use of thrombin on soluble cellulose in neurosurgery," by Tracy J. Putnam, M. D., Annals of Surgery, July 1943, 118, No. 1.

"Leishmaniasis," Tropical Diseases Bulletin, June 1943, vol. 40, No. 6.

"Fibrin Suture of Peripheral Nerves, by J. Z. Young, M. A. Oxfd.; & P. B. Medawar, M. A. Oxfd., Lancet, August 3, 1940, vol. 239, 1940.

"Human red cell concentrate for surgical dressings," by John J. Moorhead, M. D. and Lester J. Unger, M. D., New York city, Am. Journal of Surgery, LIX No. 1, January 1943, pages 104–105.

Pages 243 and 244 of McLeod's Physiology in Modern Medicine, published in 1938 as the eighth edition of the work in question. Publishers, The C. V. Mosby Co., St. Louis, Missouri. A copy is available in Div. 55 of Patent Office.